H. W. HAAPANEN.
BRAKE ATTACHMENT FOR AUTOMOBILES.
APPLICATION FILED AUG. 5, 1919.
1,350,726. Patented Aug. 24, 1920.
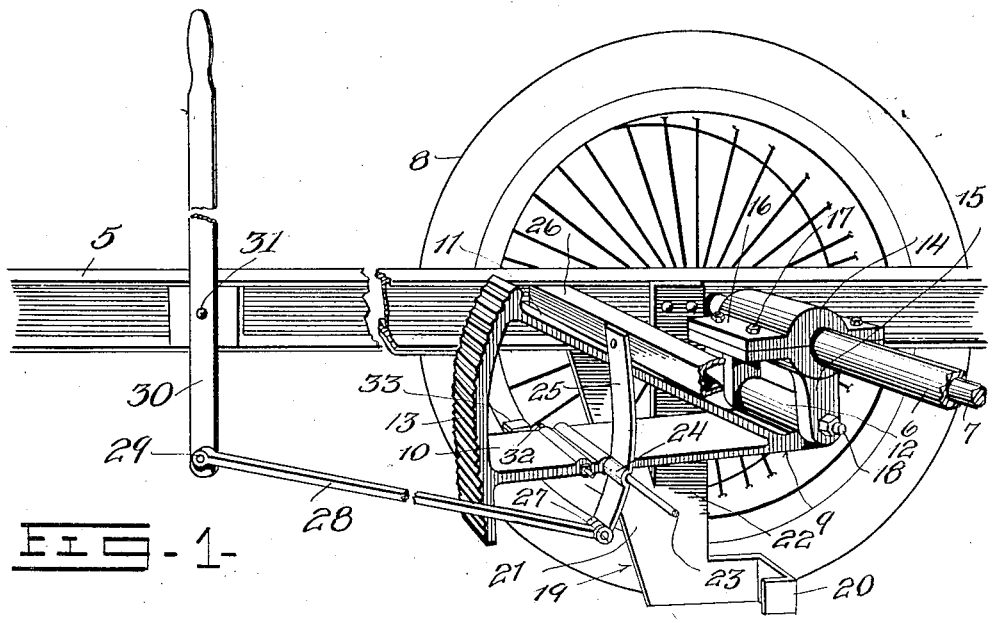
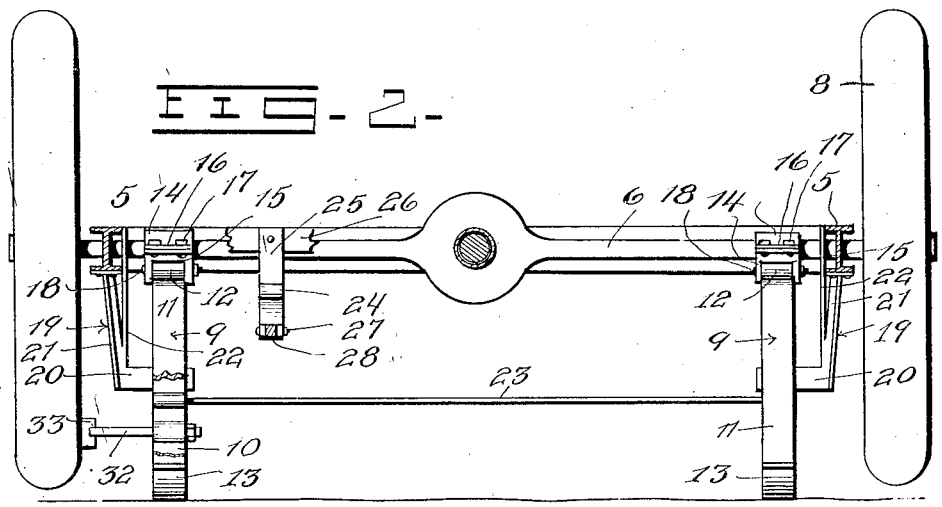
Inventor
H. W. Haapanen
By Munn & Co.
Attorney

UNITED STATES PATENT OFFICE.

HENRY WALDEMAR HAAPANEN, OF TELLURIDE, COLORADO.

BRAKE ATTACHMENT FOR AUTOMOBILES.

1,350,726.  Specification of Letters Patent.  Patented Aug. 24, 1920.

Application filed August 5, 1919. Serial No. 315,500.

*To all whom it may concern:*

Be it known that I, HENRY W. HAAPANEN, a citizen of the United States, residing at Telluride, in the county of San Miguel and State of Colorado, have invented new and useful Improvements in Brake Attachments for Automobiles, of which the following is a specification.

My invention relates to a brake device for automobiles or other vehicles.

An important object of the invention is to provide a device of the above mentioned character, having elements or shoes which engage with the road-bed, for positively stopping the automobile or preventing skidding, and which may also serve as supporting means to retain the tires elevated from contact with the bed, when the machine is not in use.

A further object of the invention is to provide means operated by a wheel of the automobile to return the shoe or shoes to the elevated or inactive position.

Other objects and advantages of the invention will be apparent during the course of the following description.

In the accompanying drawings, forming a part of this specification, and in which like numerals are employed to designate like parts throughout the same, Figure 1 is a perspective view of the device embodying my invention, showing the same in use, with parts broken away, and, Fig. 2 is a side elevation of the device.

In the drawings, wherein for the purpose of illustration is shown a preferred embodiment of my invention, the numeral 5 designates longitudinal beams included in the frame or chassis of the automobile. The numeral 6 designates the rear axle casing receiving the rear axle sections 7, which carry the rear wheels 8, as is customary.

My brake device embodies a pair of road-bed engaging elements 9, which are preferably hollow and triangular. Each element embodies a rear leg 10 and a forward leg 11, which are connected at their inner ends, and carry an apertured knuckle 12. The outer ends of the legs 10 and 11 are connected by a transverse shoe 13, preferably corrugated, as shown.

The ears 12 are arranged between pairs of apertured knuckles 14, carried by lower parts 15 of clamps, having upper parts 16, secured thereto by bolts 17. The apertured ears 18 are pivotally connected by bolts 14, as shown. The clamps are rigidly secured to the axle casing 16, and it is obvious that the road-bed engaging elements are adapted to swing in a vertical plane, longitudinally of the machine, into and out of engagement with the road-bed, such elements moving downwardly by gravity.

The numeral 19 designates stops, arranged to limit the rearward movement of the ground engaging elements to hold them in a perpendicular position when they are lowered. Each stop embodies a lateral extension 20, arranged in the path of travel of the element 10, and carried by arms 21 and 22, which are bolted or otherwise rigidly secured to the beam 5.

Means are provided to lock the elements 9 in the elevated or inactive position, comprising a transverse horizontal rod 23 secured to the rear legs 10, and adapted to be engaged within a socket 24 formed in a resilient catch 25, having its upper end secured to a transverse bar 26, the opposite ends of which are secured to the beam 5. Pivotally connected with the lower end of the resilient catch 25, as shown at 27, is a link 28, having pivotal connection, as shown at 29, with the lever 30, pivoted to the beam 5, at 31. It is thus seen that by swinging the lever 30 rearwardly, the spring catch 25 will disengage the rod 23 and the elements 9 will be free to drop to the lowermost position.

Means are provided for returning the elements 9 into the upper position, comprising a pin or bolt 32, preferably permanently connected with the leg 10 of one element 9, and projecting into the path of travel of a spring-catch 33, when the elements 9 are in the lowered position, but out of the path of travel of the same when such elements 9 are elevated, which is due to the fact that the elements 9 are eccentrically pivoted to the shaft 7, while the wheels 8 are concentrically carried thereby. The spring-catch 33 is preferably permanently secured to one wheel 8, in any suitable manner.

As clearly shown in Fig. 2, the elements 9 extend forwardly beyond the circumference of wheels 8, and when these elements are dropped downwardly in engagement with the road-bed, while the machine is traveling, they will elevate the wheels out of contact with the road-bed and thereby cut off the propelling action of the wheels, at the same time serving to stop the travel of the machine, by contact with the road-bed. When it is desired to turn the elements 9 to the upper position, the automobile must be moved rearwardly slightly, so that the elements 9 will turn upon their pivots and the wheels 8 lowered in contact with the ground. The machine may now be backed, by its own power, and the bolt 32 will be engaged by the spring-catch 33, shifting the elements 9 to the upper position, the bolt 32 and spring-catch 33 automatically disengaging when the elements 9 reach the upper position.

Having thus described my invention, I claim:

1. In apparatus of the character described, a pair of road-bed engaging elements, means pivotally connecting the elements with the frame of the automobile, a transverse rod connecting the elements, a spring catch connected with the frame of the automobile and arranged to engage the rod, a lever to move the spring catch, stops secured to the frame and arranged in the path of travel of said elements, a bolt for detachable connection with one element, and a lug carried by one wheel to engage the bolt.

2. In apparatus of the character described, a pair of road-bed engaging elements, means pivotally connecting the elements with the frame of the automobile, means adapted to normally hold the elements in the elevated position and to release the same when desired, stops connected with the frame of the automobile and arranged in the path of travel of the elements, and means operated by one wheel of the automobile to return the elements to the elevated position.

3. A device as herein characterized, a pair of road bed engaging elements suspended from the frame of the automobile within the vertical plane of the wheels, means pivotally connecting said elements with the frame, means connecting said pair of road engaging elements, stops connected with the frame and positioned in the path of rearward travel of the road engaging elements to limit their gravital movement, and means to normally hold the means connecting the pair of road elements in raised position, and to release the same when desired.

4. In apparatus of the character described, a road-bed engaging element pivotally connected with the frame of an automobile and adapted to extend radially beyond the wheel for a substantial distance, stop means carried by the frame and extending laterally across the rearward path of the road-bed engaging element and adapted to engage and hold said element in its lowered position, engaging the element in the lowered position to hold it approximately perpendicular, and means to normally hold the element in the elevated position.

5. In a device as herein characterized, in combination, a road engaging shoe pivotally suspended from the underframe of an automobile and positioned to engage the ground by a swinging movement inside the vertical plane of the vehicle wheel, a rigid stop carried by the underframe and projecting across the path of said shoe to limit its rearward swing, the active end of said shoe extending radially beyond the circumference of the vehicle wheels, and common means for holding said shoe in inactive position and to release the same for action.

6. In an apparatus of the character described, a road bed engaging element pivotally mounted to the underframe of the automobile and adapted to swing in a vertical plane, means for normally holding said element in an elevated position and to release the same, stop means carried by the frame to limit the rearward swing of the road engaging element, a projection on said element extending laterally toward the wheel, and means carried on the wheel engaging said projection upon reverse revolution of the wheel, to return the road-bed engaging element to inactive position.

HENRY WALDEMAR HAAPANEN.